United States Patent [19]
Hess

[11] Patent Number: 5,833,253
[45] Date of Patent: Nov. 10, 1998

[54] LOCKING MECHANISM FOR MOVABLE SUBFRAME OF TRACTOR-TRAILERS

[75] Inventor: Timothy V. Hess, Smithville, Ohio

[73] Assignee: The Boler Company, Itasca, Ill.

[21] Appl. No.: 934,417

[22] Filed: Sep. 19, 1997

[51] Int. Cl.⁶ .................................................. B62D 33/08
[52] U.S. Cl. .................................... 280/149.2; 280/405.1; 280/407.1
[58] Field of Search .............................. 280/149.2, 405.1, 280/407.1; 180/209

[56] References Cited

U.S. PATENT DOCUMENTS

| | | | |
|---|---|---|---|
| 4,286,797 | 9/1981 | McKosh, Jr. et al. | 280/149.2 |
| 4,641,846 | 2/1987 | Ehrhart | 280/149.2 |
| 5,199,732 | 4/1993 | Lands et al. | 280/407.1 |
| 5,449,190 | 9/1995 | Ford | 280/407.1 |
| 5,451,069 | 9/1995 | Schueman | 280/149.2 |
| 5,564,725 | 10/1996 | Brazeal . | |
| 5,720,489 | 2/1998 | Pierce et al. | 280/149.2 |

Primary Examiner—Christopher P. Ellis
Attorney, Agent, or Firm—Hudak & Shunk Co., L.P.A.; David P. Dureska

[57] ABSTRACT

A movable subframe for tractor-trailers, commonly referred to as a slider, includes an improved retractable pin mechanism for locking the movable subframe in a selected position relative to the tractor-trailer body. A manually operated handle is used to pneumatically actuate the pin mechanism, or in the event that the mechanism is unable to be pneumatically actuated, to manually actuate the pin mechanism. Conversion between the pneumatic and manual actuation modes is accomplished without modification to the retractable pin mechanism. More specifically, a handle assembly, which in the pneumatic mode operates generally independent of the other parts of the pin mechanism, is manually moved from a starting position in which the pins are in an extended locked position, to a first position to engage a button valve thereby opening the valve to supply air to an air chamber, which in turn causes pneumatic actuation and retraction of the pin mechanism. Alternatively, the handle assembly can be moved directly from the starting position to a second position, bypassing the first position and the pneumatic mode, whereby the handle assembly operates integrally with the other parts of the pin mechanism, which in turn causes manual actuation and retraction of the pin mechanism.

10 Claims, 7 Drawing Sheets

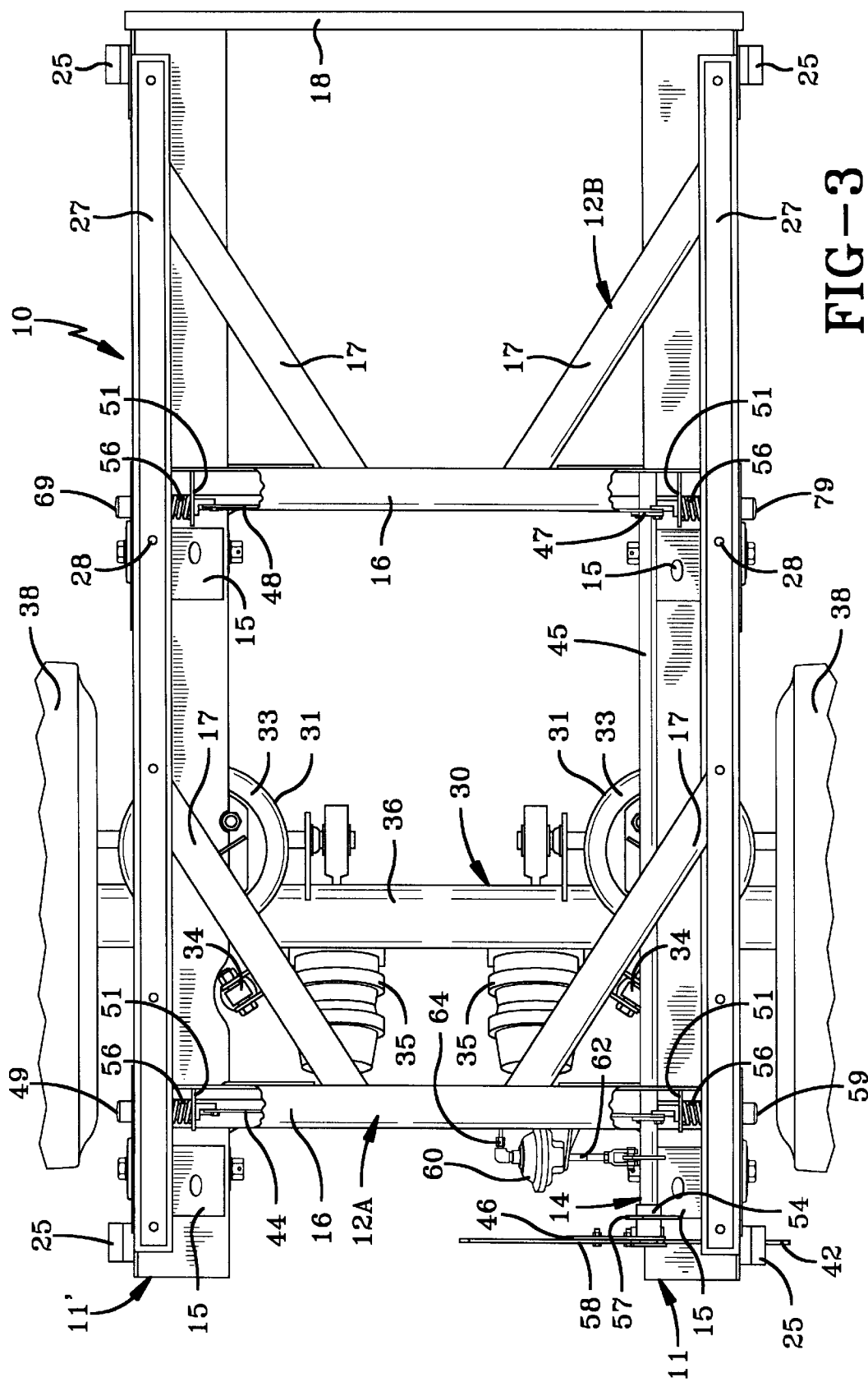

LOCKING MECHANISM FOR MOVABLE SUBFRAME OF TRACTOR-TRAILERS

BACKGROUND OF THE INVENTION

1. Technical Field

The invention relates to tractor-trailer subframes, and in particular to movable subframes for tractor-trailers. More particularly, the invention is directed to a movable subframe for tractor-trailers which includes a retractable pin mechanism for locking the movable subframe in a selected position relative to the tractor-trailer body, wherein the retractable pin mechanism is pneumatically actuated by a manually operated handle which opens and closes a valve that controls the air supply, and further wherein the manually operated handle can be utilized to manually actuate the locking pin mechanism without modification to the structure of the mechanism.

2. Background Art

Movable subframes, typically referred to as sliders, have been utilized on tractor-trailers or semi-trailers for many years. One or more axle/suspension systems usually are suspended from a single slider structure. The slider is in turn mounted on the underside of the trailer body, and is movable longitudinally therealong to provide a means of variable load distribution. More specifically, the amount of cargo that a trailer may carry is governed by local, state and/or national road and bridge laws, and is dependent on proper load distribution. The basic principle behind most road and bridge laws is to limit the maximum load that a vehicle may carry, as well as to limit the maximum load that can be supported by individual axles. A trailer having a slider gains an advantage with respect to laws governing maximum axle loads. More particularly, proper placement of the slider varies individual axle loads or redistributes the trailer load so that it is within legal limits.

Once properly positioned, the slider is locked in place on the underside of the trailer by a retractable pin mechanism. The retractable pin mechanism generally includes two or more, and typically four, retractable pins which may be interconnected by a usually manually or pneumatically actuated crank mechanism. When the pins are in their extended or outboardmost position, they each extend through a respective opening formed in the slider and a selected aligned one of a plurality of openings formed in the trailer body. The pins thereby lock the slider in a selected position relative to the trailer body.

However, these pins can become jammed. The mechanical advantage enjoyed by a manual operator of the pin mechanism is designed to overcome spring forces which bias the pins in the locked position, for retracting the pins when it becomes necessary to reposition the slider. The mechanical advantage is not designed to free or retract jammed pins from their locked position. Since the mechanical advantage is sometimes inadequate, prior art slider pin mechanisms rely on either the brute force of the tractor-trailer operator or add-on devices such as pneumatically actuated systems designed to release jammed pins.

In assessing the reason for jammed pins, applicant has discovered that shear forces are imposed on the individual pins. The shear forces operate in the direction of the longitudinal axis of each cylindrical pin. More specifically, slight movement of the slider relative to the trailer body during operation of the tractor-trailer can cause slight misalignment between the respective slider and trailer body openings through which each pin extends when in the locked position. This misalignment can in turn cause contact pressure points between each pin and its respective trailer body opening, aligned slider opening, and mounting bracket opening adjacent to the inboard end of the pin. The contact pressure points in turn cause the above-mentioned shear forces on the pins. Such whipsaw-like or jamming forces can become greater than the force that a tractor-trailer operator can manually apply through the crank mechanism to free the pins.

Thus, when prior art locking pin mechanisms become jammed, the operator of the tractor-trailer risks personal injury due to overexertion in attempting to manually free jammed pins, and further risks damaging the retractable pin mechanism. Specifically, a typical method of attempting to release prior art jammed pin mechanisms is for the tractor-trailer operator to rock the trailer fore and aft, while an assistant manually operates the retractable pin mechanism. The rocking motion briefly realigns the misaligned openings, so that the assistant can retract the pins during the period of realignment. The process has been simplified by various prior art quick-release devices, such as pneumatically operated quick-release devices, which generally allow the vehicle operator to maneuver the trailer while the quick release device automatically frees the jammed pins, thus effectively obviating the need for another person to manually operate the crank mechanism. However, in the event that such a quick-release device becomes inoperable and it is desired to manually operate the locking pin mechanism, prior art quick-release devices either do not provide for manual actuation of the locking pin mechanism, or require structural modification to enable the retractable pin mechanism to be manually actuated. In the former case, the tractor-trailer will have to be taken out of service until the quick-release device can be repaired. In the latter case, structural modifications to convert from pneumatic to manual actuation, can be inconvenient, time consuming and/or require special tools which may not be available to the operator of a tractor-trailer who is on the road.

The present invention solves the problem of pneumatic quick-release devices which are non-convertible to manual actuation, and of quick-release devices which require structural modification to convert from a pneumatic mode to a manual mode of actuation. This is accomplished through the improved design of the locking mechanism for movable subframes of tractor-trailers of the present invention, which includes a manually operated handle which travels vertically within a slot having three vertically arranged detents. More specifically, when the handle is positioned in the lowermost detent of the slot, a valve controlling an air supply to the pneumatically actuated retractable pin mechanism remains closed and the bias of a coil spring of each pin urges the pins to their extended locked positions. When the handle is moved upwardly and into the middle detent of the slot, a button on the valve is depressed, thereby opening the valve and supplying air to a pneumatic chamber which in turn rotates the pin mechanism linkage and retracts the pins to an unlocked position to permit repositioning of the slider relative to the trailer body. However, if the pneumatic mechanism is disabled or otherwise becomes inoperable, and it is desired to retract the pins utilizing manual force, the handle can be moved upwardly within the slot from the lowermost detent to the uppermost detent, completely bypassing the middle detent and the valve controlling the air supply which remains closed. On its upward travel past the middle detent, the free-wheeling handle and associated assembly engages a bracket attached to the pin mechanism linkage to retract the pins to an unlocked position. Thus, it can be appreciated that the locking mechanism of the present invention can operate in the pneumatic mode or the manual mode to retract the locking pins of the mechanism, without any structural modification to the mechanism.

SUMMARY OF THE INVENTION

Objectives of the present invention include providing a locking mechanism for movable subframes of tractor-trailers which is operable in both a pneumatic mode and a manual mode, without requiring structural modification of the arrangement of parts of the locking mechanism.

Another objective of the present invention is to provide such an improved locking mechanism for sliders, whereby pins of the mechanism can be retracted from a locked position by a single operator with limited physical exertion, regardless of whether the pins are jammed in the locked position.

A still further objective of the present invention is to provide such an improved locking mechanism for sliders which is economical, durable and easy to use.

These objectives and advantages are obtained by the locking mechanism for movable subframes of a tractor-trailer, the general nature of which may be stated as including a retractable locking pin mechanism of a subframe structure for a vehicle trailer, the subframe structure being movably mountable on spaced-apart, parallel elongated rails mounted on the bottom of the trailer, the trailer rails each being formed with a plurality of openings, the subframe structure including a pair of spaced-apart, parallel elongated main members, the main members each including means for movably engaging a respective one of the trailer rails, the main members each further being formed with at least one locking pin opening, the main member opening being selectively alignable with its respective trailer rail openings, for passage of a generally complementary-sized and shaped locking pin through the respective aligned openings for locking the subframe structure in a selected position relative to the vehicle trailer, the retractable locking pin mechanism including means for extending the pin to a locked position and a retraction mechanism for retracting the pin to an unlocked position, wherein the improvement comprises retraction mechanism actuation means including, manually operable handle means movably mounted on the retraction mechanism for selective pneumatic and manual actuation of the retraction mechanism, and selection means mounted on the subframe structure adjacent the handle means, the handle means being selectively moveable relative to the selection means to a first, a second and a third position of the selection means, whereby the locking pin passes through the respective aligned openings for locking the subframe structure in a selected position relative to the vehicle trailer when the handle means is moved to the first position, and further whereby the handle means operates generally independent of the retraction mechanism when the handle means is moved from the first position to the second position, the handle means engaging valve means in the second position for pneumatically actuating the retraction mechanism, and still further whereby the handle means operates generally integrally with the retraction mechanism when the handle means is moved from the first position directly to the third position, the handle means engaging the retraction mechanism when the handle means is moving intermediate the second and the third positions for manually actuating the retraction mechanism.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 3 is a fragmentary top plan view, with portions broken away, of the slider incorporating the locking pin mechanism of the present invention shown in FIG. 2;

Similar numerals refer to similar parts through-out the drawings.

DESCRIPTION OF THE PREFERRED EMBODIMENT

Figure 1:
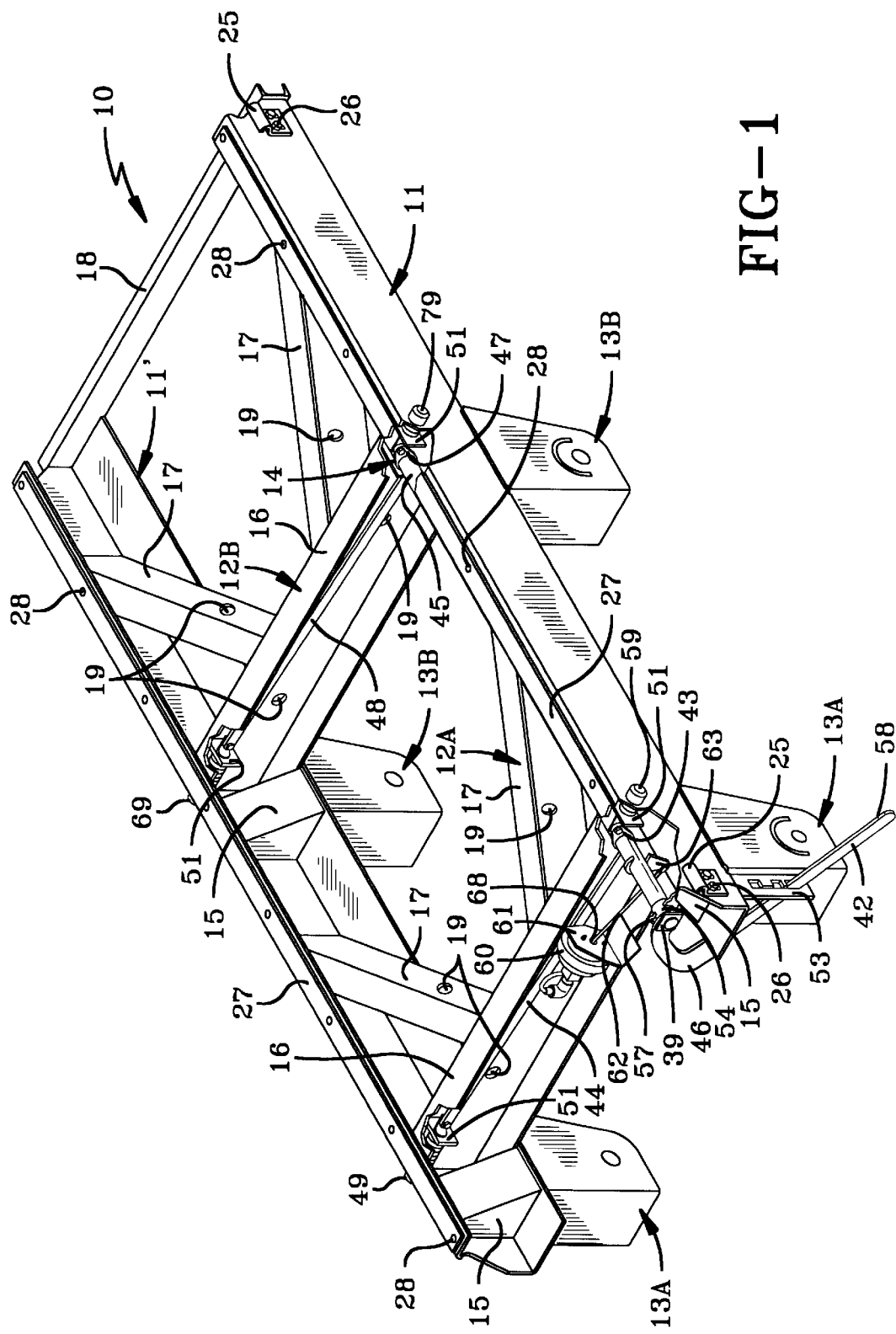
FIG. 1 is a fragmentary perspective view with portions broken away, of a slider for tractor-trailers, showing the locking pin mechanism of the present invention installed on the tractor-trailer slider.

A slider of a tractor-trailer incorporating the improved retractable locking pin mechanism of the present invention is indicated generally at 10 and is shown in FIG. 1. Slider 10 includes a pair of main members 11,11', front and rear generally K-shaped cross member structures 12A and 12B, respectively, front and rear pairs of hangers 13A and 13B, respectively, for suspending axle/suspension systems, and the improved retractable locking pin mechanism of the present invention 14.

Specifically, each main member 11,11' is an elongated, generally C-shaped beam made of a metal such as steel or other suitable material. The open portion of each main member 11,11' is opposed to the open portion of the other main member and faces inboard relative to slider 10. Main members 11,11' are connected to each other in spaced-apart parallel relationship by K-shaped cross member structures 12A, B.

Each K-shaped cross member structure 12 includes a base member 16 which extends between and is perpendicular to main members 11,11' (FIGS. 1 and 3). The open portion of each base member 16 faces in a frontward direction. Each end of base member 16 nests in the open portion of a respective one of main members 11,11', and is secured therein by any suitable means such as welding or mechanical fastening. Each base member 16 is a generally C-shaped beam made of a metal such as steel or other suitable material. Each front hanger 13A is attached by welding or other suitable means, to the lowermost surface of a respective one of main members 11,11' at a location directly beneath base member 16 of front K-shaped cross member structure 12A. Each rear hanger 13B is similarly attached at a location directly beneath base member 16 of rear K-shaped cross member structure 12B. Each K-shaped cross member structure 12 further includes a pair of inclined members 17, each of which is a generally C-shaped beam also made of a metal such as steel or other suitable material. The open portion of each inclined member 17 faces in an outboard-frontward direction, and each of the inclined members extends between generally the middle portion of base member 16 and a respective one of main members 11,11'. The front end of each inclined member 17 is attached at an angle to the rearwardmost surface of base member 16 by any suitable means such as welding or mechanical fastening, and the rear end of each of the inclined members is nested at an angle in the open portion of a respective one of main members 11,11', and also is attached thereto in any suitable manner such as by welding or mechanical fastening. An optional reinforcement bar 18 which extends between the rearwardmost ends of main members 11,11', adds additional strength to the structure, and is attached thereto by any suitable means such as welding or mechanical fasteners. Thus, it can be seen that base member 16 and inclined members 17 form an integral K-shaped cross member structure 12 which interconnects and maintains main members 11,11' in a spaced-apart parallel relationship.

One or more openings 19 (FIG. 1) are formed in the vertically extending surface of each base member 16 and each inclined member 17, and each of the openings is aligned with the corresponding openings formed in the other members to provide for passage of air and/or fluid conduits, electrical lines, and the like, used in the operation of the tractor-trailer (not shown).

Figure 2:
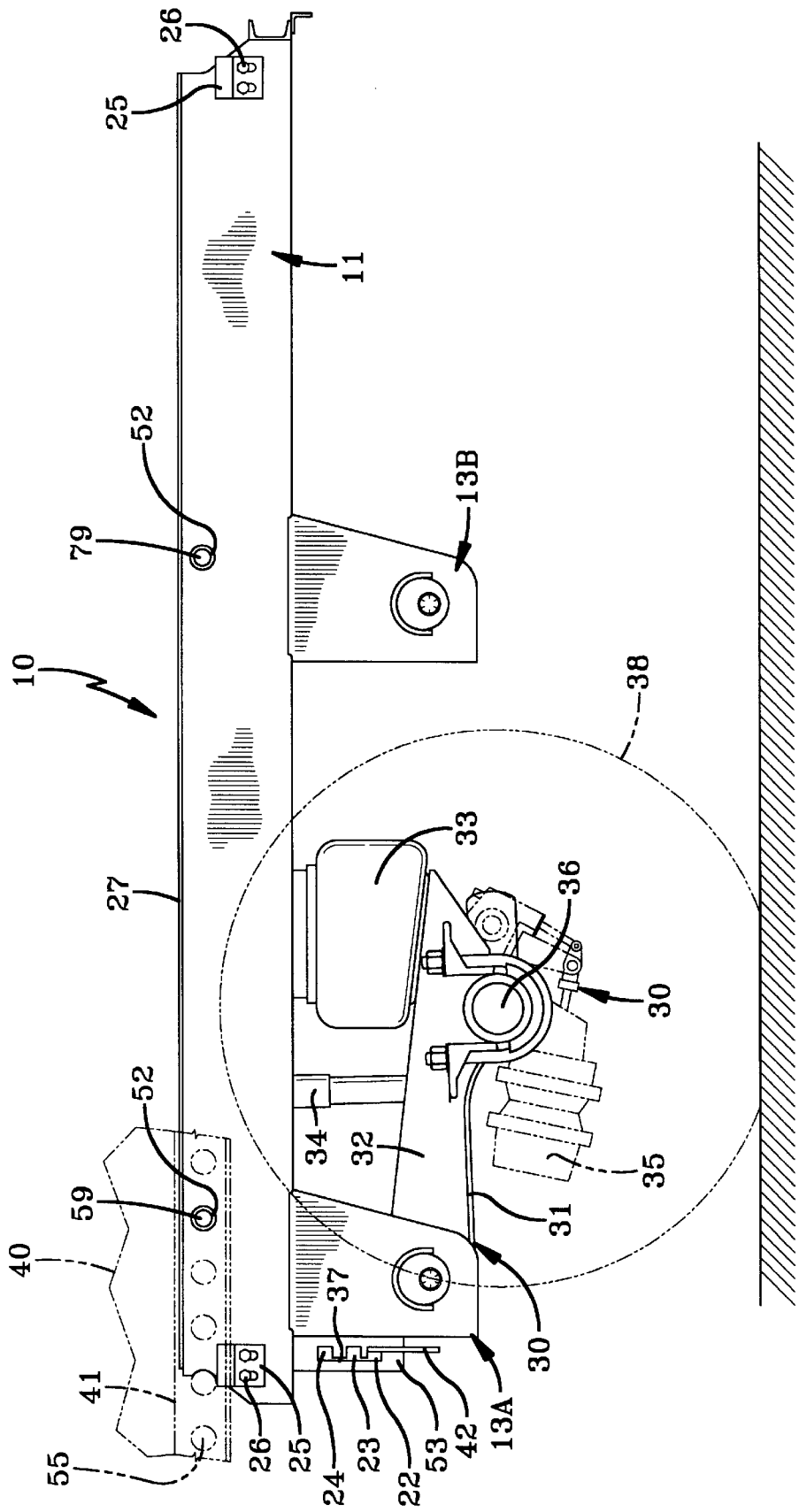
FIG. 2 is a fragmentary elevational view of the tractor-trailer slider incorporating the locking pin mechanism of the present invention, and showing only one of two axle/suspension systems which depend from the slider, with a wheel, portions of the suspension system, and a trailer rail depending from a trailer body on which the slider is movably mounted, shown in broken lines.

Each main member 11,11' has a pair of rail guides 25 mounted on its outboard surface by bolts 26 (FIGS. 1–3). Each rail guide 25 is mounted adjacent to a respective one of the ends of main members 11,11'. A low friction strip 27 is attached to the uppermost surface of each main member 11,11' by recessed fasteners 28, and extends generally the entire length of the main member. Strip 27 is formed of any suitable low-friction material, such as ultra-high molecular weight polyethylene.

As mentioned hereinabove, and as best shown in FIGS. 2 and 3, slider 10 incorporating improved retractable locking pin mechanism 14 of the present invention, supports front and rear axle/suspension systems. However, only front axle/suspension system 30 is shown in the drawings and described herein since the front and rear systems are identical in structure and operation. Moreover, inasmuch as axle/suspension system 30 is suspended from slider 10, but does not form an integral part thereof, only the major components of system 30 will be cited for aiding in the description of the environment in which the slider incorporating the improved retractable locking pin mechanism 14 of the present invention operates. Axle/suspension system 30 includes generally identical suspension assemblies 31 suspended from each hanger 13A of the pair of front hangers. A reinforcement box 15 is mounted by any suitable means in the open portion of each main member 11,11' frontward of and adjacent to each end of each of base members 16, to provide additional strength to slider 10 for supporting hangers 13A, B, and their associated suspension assemblies 31. Each suspension assembly 31 includes a suspension beam 32 which is pivotally mounted on hanger 13A in a usual manner. An air spring 33 is suitably mounted on and extends between the upper surface of the rearwardmost end of suspension beam 32 and main member 11,11', at a location directly beneath the outboard end of a respective one of inclined members 17 of K-shaped cross-member structure 12A. A shock absorber 34 extends between and is mounted on suspension beam 32 and the respective inclined member 17. Another component of suspension assembly 31, mentioned herein only for the sake of relative completeness, is an air brake 35. An axle 36 extends between and is captured in the pair of suspension beams 32 of axle/suspension system 30. One or more wheels 38 are mounted on each end of axle 36.

Slider 10 is movably mounted on trailer body 40 by slidable engagement of rail guides 25 with spaced-apart, parallel and generally Z-shaped rails 41 (FIG. 2), which are mounted on and depend from the underside of the trailer body. Each low friction strip 27 abuts the bottom surface of the uppermost portion of a respective one of rails 41 to provide a smooth, generally friction-free contact surface for slidable movement of slider 10 on trailer body 40.

In accordance with one of the main features of the present invention, slider 10 can be selectively positioned relative to trailer body 40 for optimum load distribution by improved retractable locking pin mechanism 14 of the present invention. As best shown in FIGS. 1 and 3, pin mechanism 14 includes an elongated pivot rod 45 which passes rearwardly through an aligned pair of openings (not shown) formed in base member 16 and a predetermined one of inclined members 17 of front K-shaped cross member 12A adjacent to main member 11. A lever 43 is attached (FIGS. 1, 4A and 4B), by welding or other suitable means, to pivot rod 45 adjacent to the front end of the rod and frontwardly adjacent to base member 16 of front K-shaped cross member 12A. A first end of an elongated arm 44 is pivotally attached by any suitable means to a lower end of lever 43. A second end of arm 44 is pivotally attached by any suitable means to the inboard end of a pin 49 disposed adjacent to opposite main member 11'. An upper end of lever 43 is pivotally attached by any suitable means to the inboard end of a pin 59 disposed adjacent to main member 11. A lever 47 similarly is attached to pivot rod 45 adjacent to the rear end of the rod and frontwardly adjacent to base member 16 of rear K-shaped cross member 12B. A first end of an elongated arm 48 is pivotally attached to a lower end of lever 47. A second end of arm 48 is pivotally attached to the inboard end of a pin 69 disposed adjacent to opposite main member 11'. An upper end of lever 47 is pivotally attached to the inboard end of a pin 79 disposed adjacent to main member 11.

The inboard end of each pin 49, 59, 69, 79 is slidably mounted (FIGS. 1, 3, 4A and 4B) in an opening (not shown) formed in a bracket 51 which is attached by suitable means such as welding to a respective one of base members 16. An enlarged outboard end of each pin 49, 59, 69, 79 passes through an opening 52 formed in a respective one of main members 11,11'.

In accordance with a key feature of the present invention, the above-described arrangement of parts including levers 43, 47, elongated arms 44, 48, pivot rod 45, and pins 49, 59, 69, 79, can be pneumatically or manually actuated by a manually operated handle assembly 58. Handle assembly 58 includes an elongated handle 42, a generally C-shaped arm 46, a guide tube 54, and a guide tube support 57. Handle 42 is mounted on generally C-shaped outboard-facing arm 46 by a pair of threaded bolts 50 which each pass through a respective one of a first pair of openings 20 (FIG. 7A) formed in handle 42 and a pair of aligned openings (not shown) formed in arm 46. Handle 42 is secured to arm 46 by a pair of nuts 29 each threadably engaged with a respective one of bolts 50. An outboard end of handle 42 extends outboardly away from main member 11 through a vertically disposed travel slot 37 formed in a rectangular-shaped plate 53, which is attached by any suitable means such as welds to a front surface of hanger 13A and the bottom surface of main member 11 from which the hanger depends (FIGS. 1–4B). vertically disposed travel slot 37 includes discrete lower, middle and upper cutouts or detents 22, 23 and 24, respectively, which are formed in plate 53 and communicate with the slot. The outboardly extending disposition of handle 42 enables easy grasping of the handle to operate retractable pin mechanism 14 of the present invention, which operation will be described in detail hereinbelow. An upper end of C-shaped arm 46 is immovably mounted, such as by welding, on guide tube 54 which in turn is rotatably mounted about the front end of pivot rod 45. Guide tube 54 is captured on pivot rod 45 by an L-shaped bracket 39 which is welded or otherwise immovably mounted on the end of the pivot rod. Guide tube support 57 is securely mounted, such as by welding, on frontwardmost reinforcement box 15 of main member 11, and extends inboardly adjacent to guide tube 54. Guide tube support 57 maintains uniform spacing of the guide tube about pivot rod 45 by preventing outboard, inboard or vertical movement of the tube which could interfere with the desired rotational movement of the tube or the rod. It is important to note that this concentrically-spaced arrangement of guide tube 54 about pivot rod 45 enables operation of locking mechanism 14 in the pneumatic mode without placing undesirable forces on the handle assembly 58, which operates generally independent of the other parts of locking mechanism 14 in the pneumatic mode, but operates integrally with the other parts in the manual mode. An air chamber 60, of the type which is well-known to the art and to the literature, is securely mounted on a bracket 61 by any suitable means such as nuts 67, and the bracket in turn is mounted on the front surface of base member 16 of front K-shaped cross member 12A by any suitable means such as welding. A piston rod 62 of air chamber 60 extends outboard toward pivot rod 45 from the air chamber through an opening 68 formed in bracket 61 (FIG. 1). The outboard end of piston rod 62 is pivotally attached by suitable means to a bracket 63 which in turn is immovably mounted intermediate guide tube 54 and lever 43 on pivot rod 45 such as by welds.

Figure 4B:
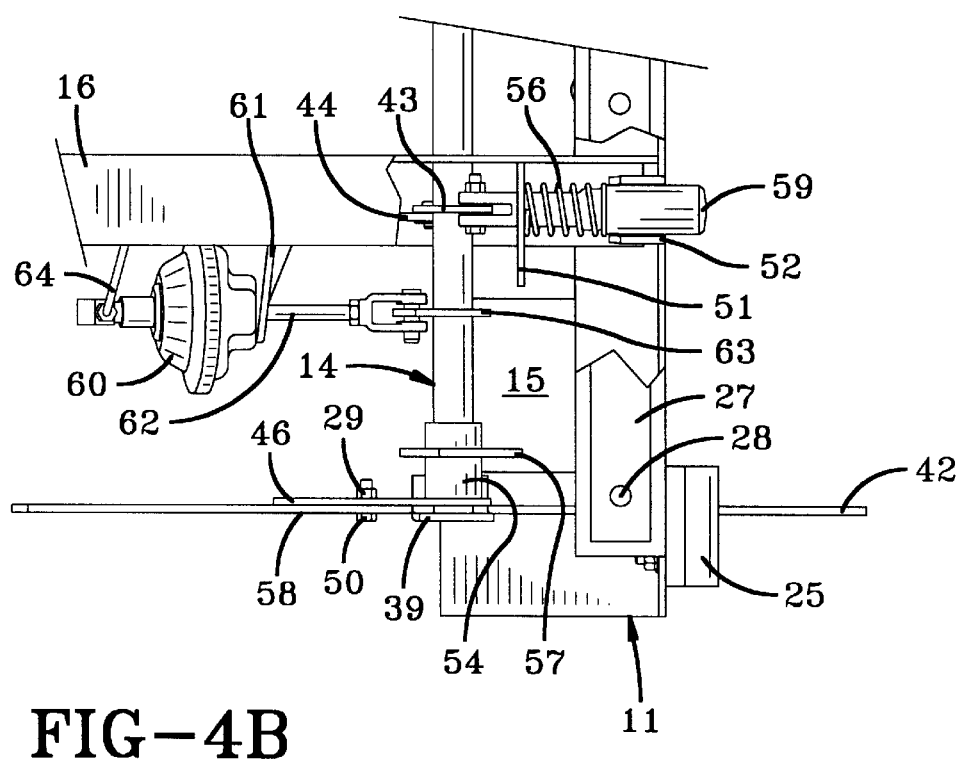
FIG. 4B is a fragmentary top plan view, with portions broken away, of the arrangement of parts shown in FIG. 4A.
Figure 4A:
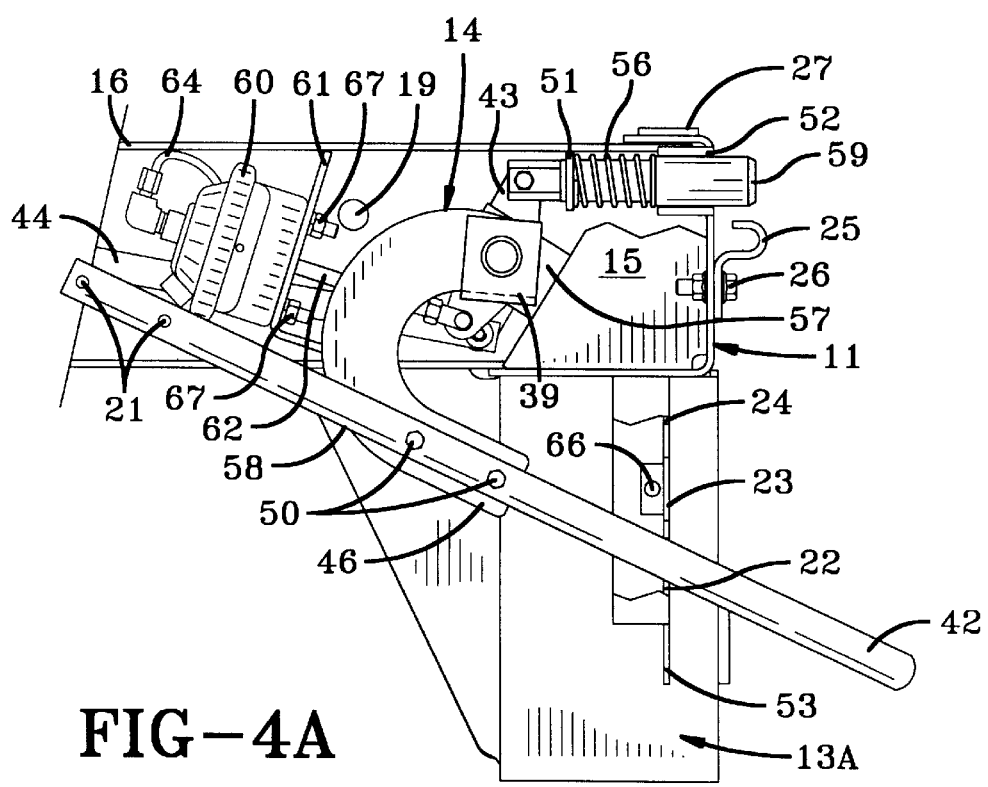
FIG. 4A is an enlarged fragmentary front view, with portions broken away, of the manually operated handle and associated parts of the retractable locking pin mechanism of the present invention, with the handle shown engaged in the lowermost detent and the pins in an extended locked position.
Figure 5B:
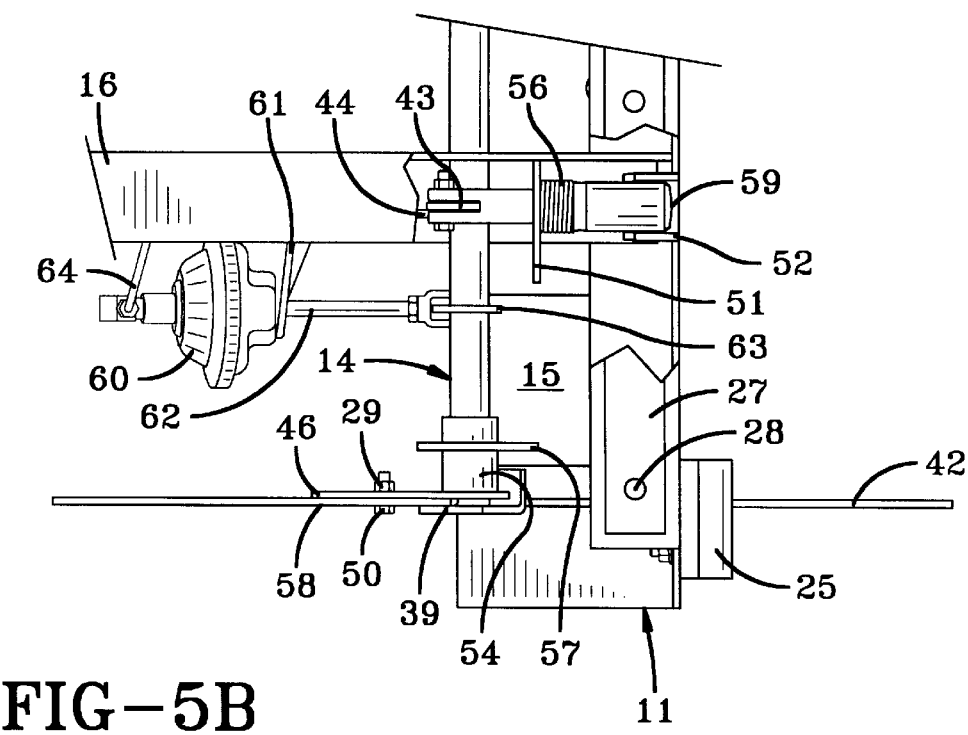
FIG. 5B is a fragmentary top plan view, with portions broken away, of the arrangement of parts shown in FIG. 5A.
Figure 5A:
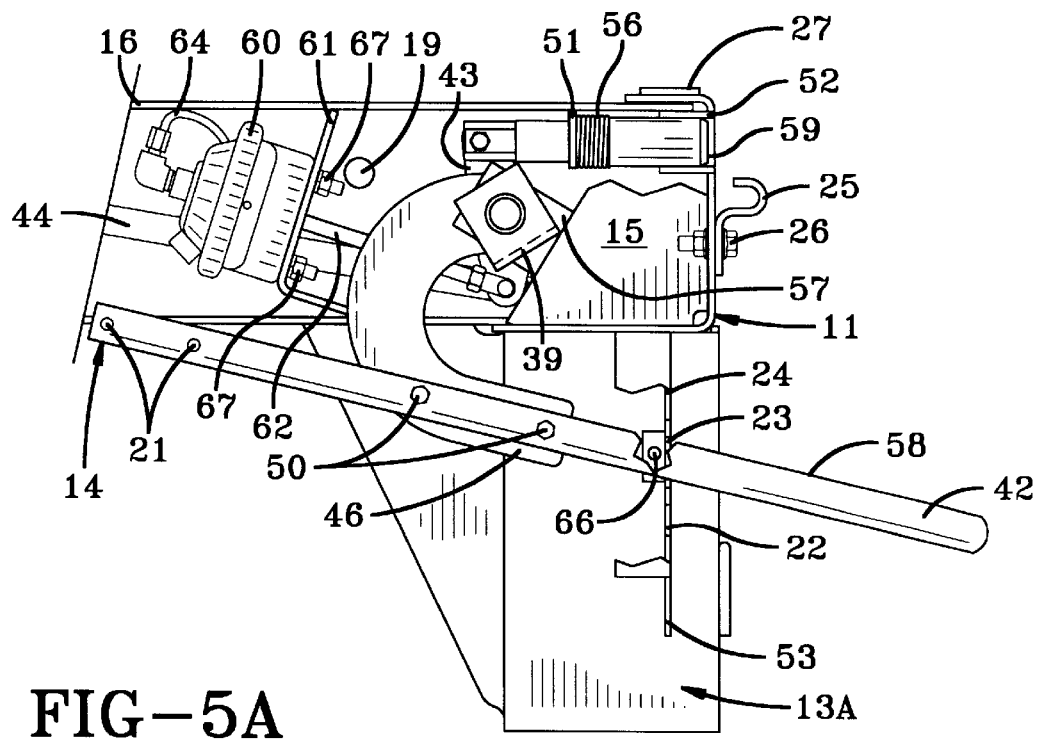
FIG. 5A is a view similar to FIG. 4A, but showing the handle of the pin locking mechanism engaged in the middle detent and depressing a button of an air valve to open the valve, causing pneumatic actuation of the locking mechanism and retraction of the pins to an unlocked position.

Improved retractable locking pin mechanism 14 of the present invention useful in slider 10 of a tractor-trailer is operated in the following manner. When it is desired to lock slider 10 in a selected position relative to trailer body 40, main member openings 52 are aligned with selected ones of a plurality of correspondingly-sized openings 55 formed in rails 41 of trailer body 40 (FIG. 2). Each pin 49, 59, 69, 79 automatically extends through the selected aligned openings 52, 55, since the pin is biased in an outboard direction by a coil spring 56 captured between bracket 51 and the enlarged outboard end of the pin. When it is again desired by the operator of the tractor-trailer to move slider 10 beneath trailer body 40 using the pneumatic mode of locking mechanism 14 of the present invention, the parking brake of the trailer is engaged, and handle 42 is disengaged from lower detent 22 (FIGS. 1, 2 and 4A) by manually applying frontward pressure to the outboard end of the handle to move the handle horizontally out of the lower detent and into travel slot 37. Handle 42 then is pulled vertically upwardly within slot 37 to the level of middle detent 23, and rearward pressure then is applied to the handle to positively engage the handle in the middle detent. During movement from lower detent 22 to middle detent 23, handle 42 in turn causes movement of arm 46 which in turn causes free wheeling rotation of bearing 54 about stationary pivot rod 45. When handle 42 is positively engaged in middle detent 23, the handle depresses button valve 66 (FIG. 5A) and opens the valve and supplies air to chamber 60 via air conduit 64 from an air supply tank (not shown), which in turn causes movement of piston rod 62 in an outboard direction to rotate bracket 63 and pivot rod 45 in a counterclockwise direction, when viewed from the front of slider 10, to overcome the bias of coil springs 56 and permit retraction of pins 49, 59, 69, 79 out of aligned openings 55, 52 (FIG. 5B). Thus, slider 10 can be selectively adjusted by moving the slider longitudinally along rails 41 beneath trailer body 40 until main member openings 52 align with selected rail openings 55 and pins 49, 59, 69, 79 engage therewith as described hereinabove for maximizing load distribution. Handle 42 then can be returned to lower detent 22 and valve 66 closes and causes the release of air from chamber 60, whereby piston rod 62 moves in an inboard direction thereby causing rotation of bracket 63 and pivot rod 45 in a clockwise direction (FIGS. 4A and 4B) and enabling the bias of coil springs 56 to urge pins 49, 59, 69, 79, in an outboard direction to the extended locked position in aligned openings 52, 55.

Figure 6B:
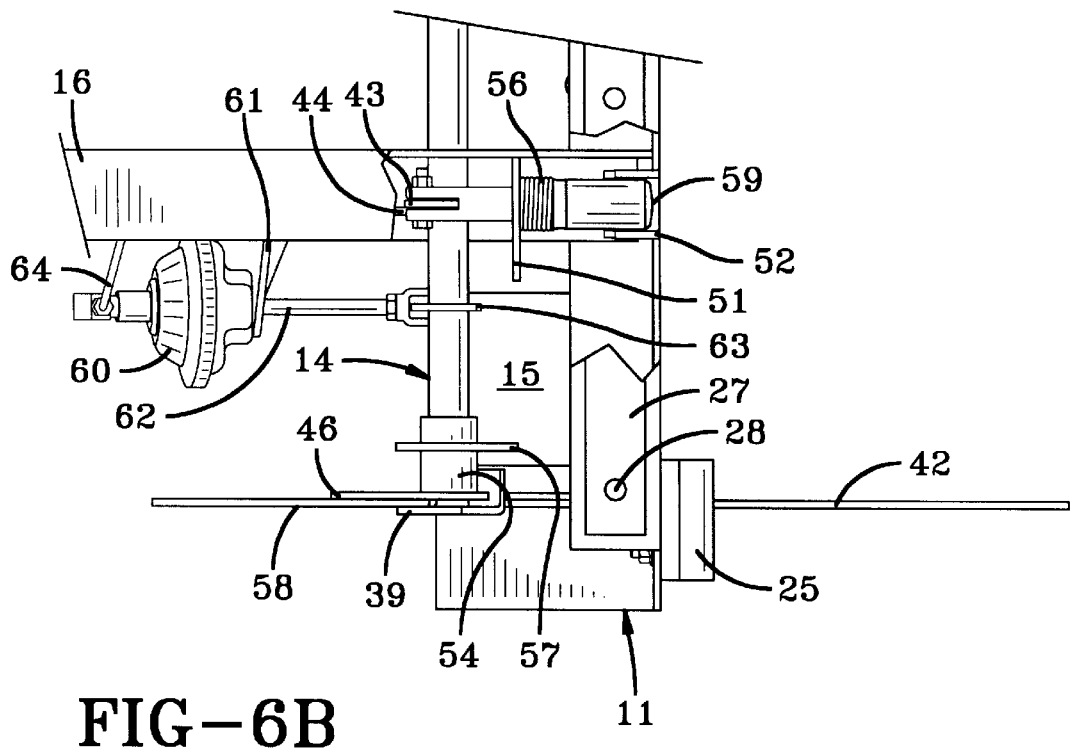
FIG. 6B is a fragmentary top plan view, with portions broken away, of the arrangement of parts shown in FIG. 6A.
Figure 6A:
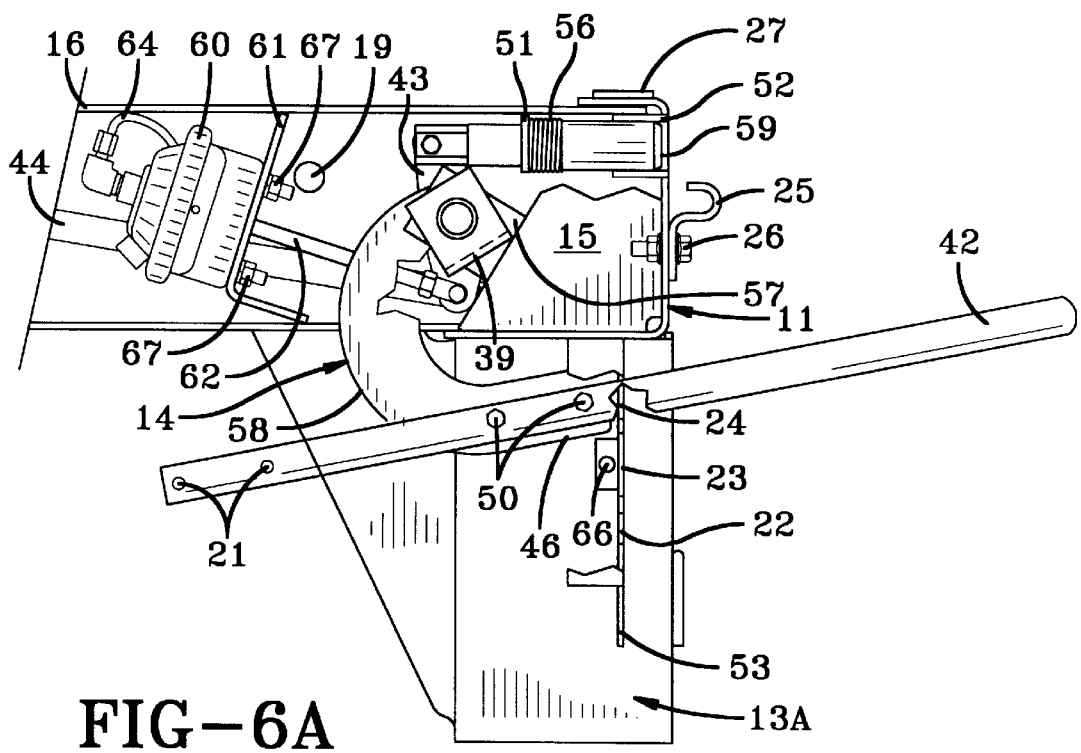
FIG. 6A is a view similar to FIGS. 4A and 5A, but showing the handle of the pin locking mechanism engaged in the uppermost detent, and further showing the manner in which an arm attached to the inboard end of the handle engages a bracket to manually retract the pins to an unlocked position.
Figure 7B:
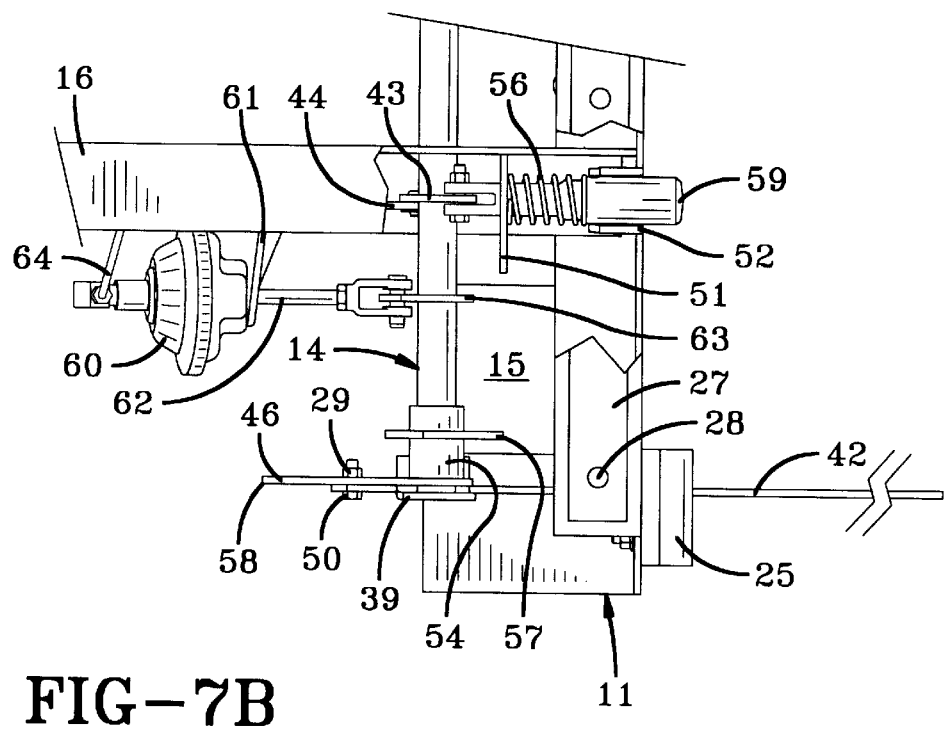
FIG. 7B is a fragmentary top plan view, with portions broken away, of the arrangement of parts shown in FIG. 7A.
Figure 7A:
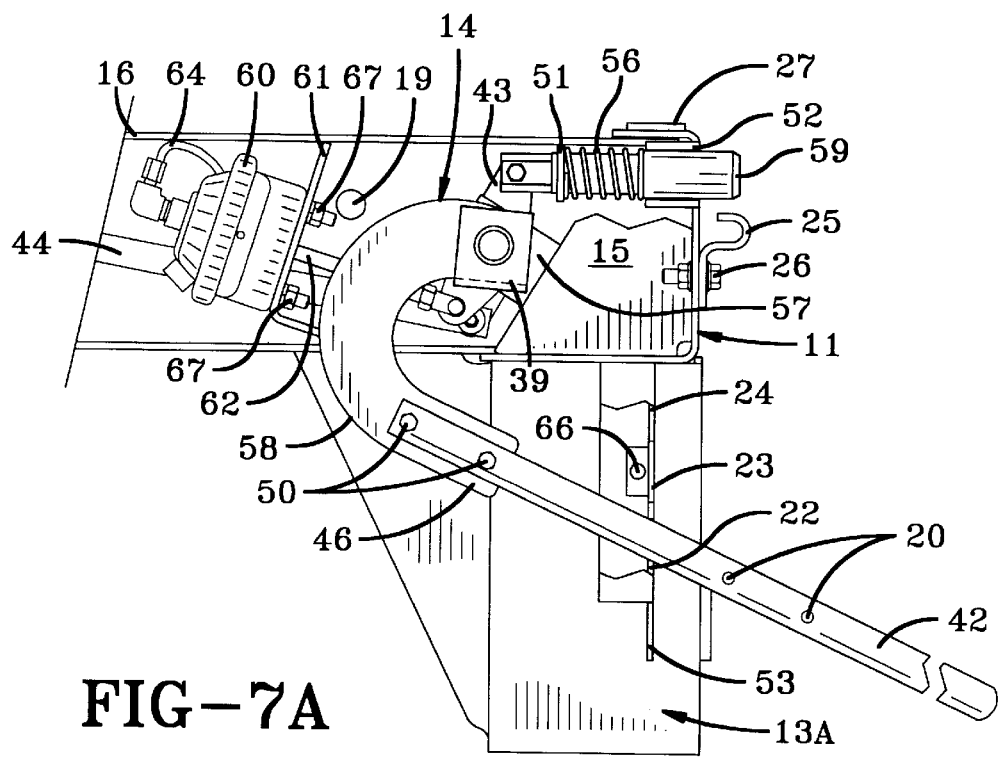
FIG. 7A is a view similar to FIG. 4A, but showing the handle of the pin locking mechanism optionally mounted on the arm in a second outboard extended position, to provide more leverage when the handle is moved to the uppermost detent to manually retract the pins.

If for any reason the air supply tank, air conduit 64, button valve 66, air chamber 60, piston rod 62, or bracket 63 become inoperable, in accordance with one of the key features of the present invention, improved retractable pin mechanism 14 can be manually actuated without modifying or otherwise adjusting the arrangement of parts described hereinabove. More particularly, when it is desired to move slider 10 beneath trailer body 40, and the pneumatic actuation capabilities of retractable pin mechanism 14 are unavailable, handle 42 can be moved directly from lower detent 22 (FIGS. 4A and 4B) to upper detent 24 (FIGS. 6A and 6B) in a single continuous motion, effectively bypassing middle detent 23. Such movement of handle 42 to its uppermost position in travel slot 37 causes arm 46 to engage L-shaped bracket 39, in turn causing counterclockwise rotation of the bracket and attached pivot rod 45, thereby overcoming the bias of coil springs 56 and retracting pins 49, 59, 69, 79. After slider 10 has been repositioned, handle 42 can be returned to lower detent 22 (FIGS. 4A and 4B). Although the above-described manual actuation of retractable pin mechanism 14 can be accomplished without any modification or adjustment of parts of the assembly, it should be noted that handle 42 can be extended outboardly even further to create additional mechanical advantage for manual actuation of the pin mechanism. This is done by removing bolts 50 and nuts 29 from first pair of handle openings 20 and aligned C-shaped arm openings (not shown), and aligning a second pair of openings 21 with the C-shaped arm openings (not shown) and securing the handle in place with the nuts and bolts (FIGS. 7A and 7B). Such additional mechanical advantage or leverage will simply aid the operator in moving locking pin mechanism 14 to a retracted position, particularly if pins 49, 59, 69, 79 are jammed, but is generally unnecessary for successful manual actuation of the pin mechanism.

Thus, it can be seen that the improved retractable locking pin mechanism 14 of the present invention overcomes shortcomings of various prior art pneumatic systems which require structural modification or adjustment of the arrangement of parts to convert from a pneumatic actuation mode to a manual actuation mode, or vice-versa. It should also be understood that the present invention, while shown in the preferred mode incorporated in a slider having a K-shaped cross member structure, can be utilized in conventional sliders having a plurality of cross beams which are perpendicular to main members 11,11'.

Accordingly, the improved locking mechanism for tractor-trailer sliders is simplified, provides an effective, safe, inexpensive, and efficient system which achieves all the enumerated objectives, provides for eliminating difficulties encountered with prior tractor-trailer slider locking mechanisms, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved locking mechanism is constructed, arranged and used, the characteristics of the construction and arrangement, and the advantageous, new and useful results obtained, the new and useful structures, devices, elements, arrangements, parts and combinations are set forth in the appended claims.

I claim:

1. A retractable locking pin mechanism of a subframe structure for a vehicle trailer, said subframe structure being movably mountable on spaced-apart, parallel elongated rails mounted on the bottom of said trailer, said trailer rails each being formed with a plurality of openings, said subframe structure including a pair of spaced-apart, parallel elongated main members, said main members each including means for movably engaging a respective one of said trailer rails, said main members each further being formed with at least one locking pin opening, said main member opening being selectively alignable with its respective trailer rail openings, for passage of a generally complementary-sized and shaped locking pin through the respective aligned openings for locking the subframe structure in a selected position relative to the vehicle trailer, said retractable locking pin mechanism including means for extending said pin to a locked position and a retraction mechanism for retracting the pin to an unlocked position, wherein the improvement comprises retraction mechanism actuation means including:

a) manually operable handle means movably mounted on said retraction mechanism for selective pneumatic and manual actuation of the retraction mechanism; and b) selection means mounted on said subframe structure adjacent said handle means, the handle means being selectively moveable relative to said selection means to a first, a second and a third position of the selection means, whereby said locking pin passes through said respective aligned openings for locking said subframe structure in a selected position relative to said vehicle trailer when said handle means is moved to said first position, and further whereby said handle means operates generally independent of said retraction mechanism when the handle means is moved from said first position to said second position, said handle means engaging valve means in said second position for pneumatically actuating said retraction mechanism, and still further whereby said handle means operates generally integrally with said retraction mechanism when the handle means is moved from said first position directly to said third position, said handle means engaging the retraction mechanism when the handle means is moving intermediate said second and said third positions for manually actuating said retraction mechanism.

2. The improved actuation means of claim 1, in which the handle means includes an elongated handle, a generally C-shaped arm, a guide tube, and a guide tube support; in which said elongated handle is mounted on said generally C-shaped arm in a normal position; in which said arm is interconnected with said guide tube; in which said guide tube is generally concentrically mounted about and spaced from a pivot rod of said retraction mechanism; in which said guide tube support generally maintains said concentric spaced position of said guide tube about said pivot rod; and in which said handle extends in an outboard direction from a selected one of said subframe structure main members so that said handle is manually accessible and operable by an operator of said vehicle trailer for selective pneumatic and manual actuation of said retraction mechanism.

3. The improved actuation means of claim 2, in which said selection means is a plate mounted on said subframe structure adjacent to and generally aligned with an outboard end of said handle; in which said plate is formed with an elongated slot which passes completely through the plate; in which said slot is further formed with a first, a second and a third detent, each of which is offset from and communicates with the slot; and in which said handle passes through and is selectively movable in said slot and is positively engageable in each of said detents.

4. The improved actuation means of claim 3, in which said elongated slot is vertically disposed in said plate.

5. The improved actuation means of claim 4, in which said first detent is disposed below said second detent; and in which said second detent is disposed below said third detent.

6. The improved actuation means of claim 3, in which said valve means is a button valve; and in which said button valve extends into said second detent in a closed position, so that upon movement of said handle from a locked pin position of said first detent into positive engagement in said second detent, said button valve is depressed and said valve is opened, for pneumatically actuating said retraction mechanism.

7. The improved actuation means of claim 3, in which a generally L-shaped bracket is mounted on said pivot rod of said retraction mechanism, so that upon movement of said handle from said first detent directly to positive engagement in said third detent, said C-shaped arm engages said L-shaped bracket when said handle is moving intermediate said second and third detents for manually actuating said retraction mechanism.

8. The improved actuation means of claim 2, in which said elongated handle is mountable on said generally C-shaped arm in an extended position, so that said handle extends in an outboard direction from a selected one of said subframe structure main members a greater distance than when said handle is mounted in said normal position for selective pneumatic and manual actuation of said retraction mechanism, and to provide additional mechanical advantage for manual actuation of said retraction mechanism.

9. The improved actuation means of claim 1, in which the means for extending said pin to a locked position is a coil spring disposed about the pin, and in which said coil spring biases said pin to the extended locked position and said retraction mechanism must overcome said bias to retract the pin to an unlocked position.

10. The improved actuation means of claim 9, in which said retraction mechanism is pneumatically actuated by an air chamber which communicates with an air supply through a conduit; in which said valve means controls the flow of air through said conduit, so that when said handle means engages said valve means, said valve means is opened and the flow of air through said conduit and said air chamber from said air supply extends a piston from the air chamber which in turn overcomes the bias of said coil spring causing said pin to retract out of said respective aligned openings for movement of said subframe structure on said trailer rails.

* * * * *